US005469101A

United States Patent [19]

Yepp

[11] Patent Number: 5,469,101

[45] Date of Patent: Nov. 21, 1995

[54] ANALOG SIGNAL SELECTION AND SUMMING CIRCUIT HAVING MULTIPLEXING CAPABILITY

[75] Inventor: Ronald J. Yepp, Redondo Beach, Calif.

[73] Assignee: Hughes Aircraft Company, Los Angeles, Calif.

[21] Appl. No.: 159,356

[22] Filed: Nov. 30, 1993

[51] Int. Cl.[6] .......... G06F 7/42

[52] U.S. Cl. .......... 327/361; 327/355; 327/407; 327/105

[58] Field of Search .......... 307/244, 362, 307/529; 328/156, 159, 158; 327/407, 361, 355, 99, 105

[56] References Cited

U.S. PATENT DOCUMENTS 3,725,675 4/1973 Olsen .......... 307/362

5,245,299 9/1993 Colvin .......... 307/529

OTHER PUBLICATIONS

Sedra et al., Microelectronic Circuits, 1991, p. 62.

*Primary Examiner*—Timothy P. Callahan
*Assistant Examiner*—Jung Ho Kim
*Attorney, Agent, or Firm*—Leonard A. Alkov; W. K. Denson-Low

[57] ABSTRACT

An analog signal selection and summing circuit including a summing amplifier having a current summing input, a plurality of voltage controlled current sources responsive to a plurality of input voltages, a plurality of switching circuits respectively associated with the current sources for controllably switching the outputs of the current sources to the summing input, a plurality of control circuits for respectively controlling the switching circuits.

3 Claims, 1 Drawing Sheet

ANALOG SIGNAL SELECTION AND SUMMING CIRCUIT HAVING MULTIPLEXING CAPABILITY

BACKGROUND OF THE INVENTION

The disclosed invention is directed generally to multiplexing circuits, and more particularly to an analog signal selection and summing circuit having multiplexing capability.

Multiplexers provide for selection of a desired analog signal source from a plurality of analog signal sources, and are commonly utilized in multi-channel systems, such as wideband multi-channel radar warning systems, wherein a plurality of analog data signals are quantized to digital signals for processing. For efficiency, the quantization is performed in a multiplexed manner wherein analog signals are provided as inputs to a multiplexer whose output commutates from one analog signal to another in a predetermined sequence.

A consideration with known multiplexers is limited switching and settling performance wherein a relatively large amount of time is required for switching to one of the input sources and settling of the output from the selected input source. Such performance limitation places a limit on the number of channels that can be processed by a quantizer, and thus requires the use of more hardware and parallel processing where the number of channels exceeds the performance of a multiplexer.

SUMMARY OF THE INVENTION

It would therefore be an advantage to provide a multiplexer that has reduced switching and settling time.

The foregoing and other advantages are provided by the invention in an analog signal selection and summing circuit that includes a summing amplifier having a current summing input, a plurality of voltage controlled current sources responsive to a plurality of input voltages, a plurality of switching circuits respectively associated with the current sources for controllably switching the outputs of the current sources to the summing input, a plurality of control circuits for respectively controlling the switching circuits.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
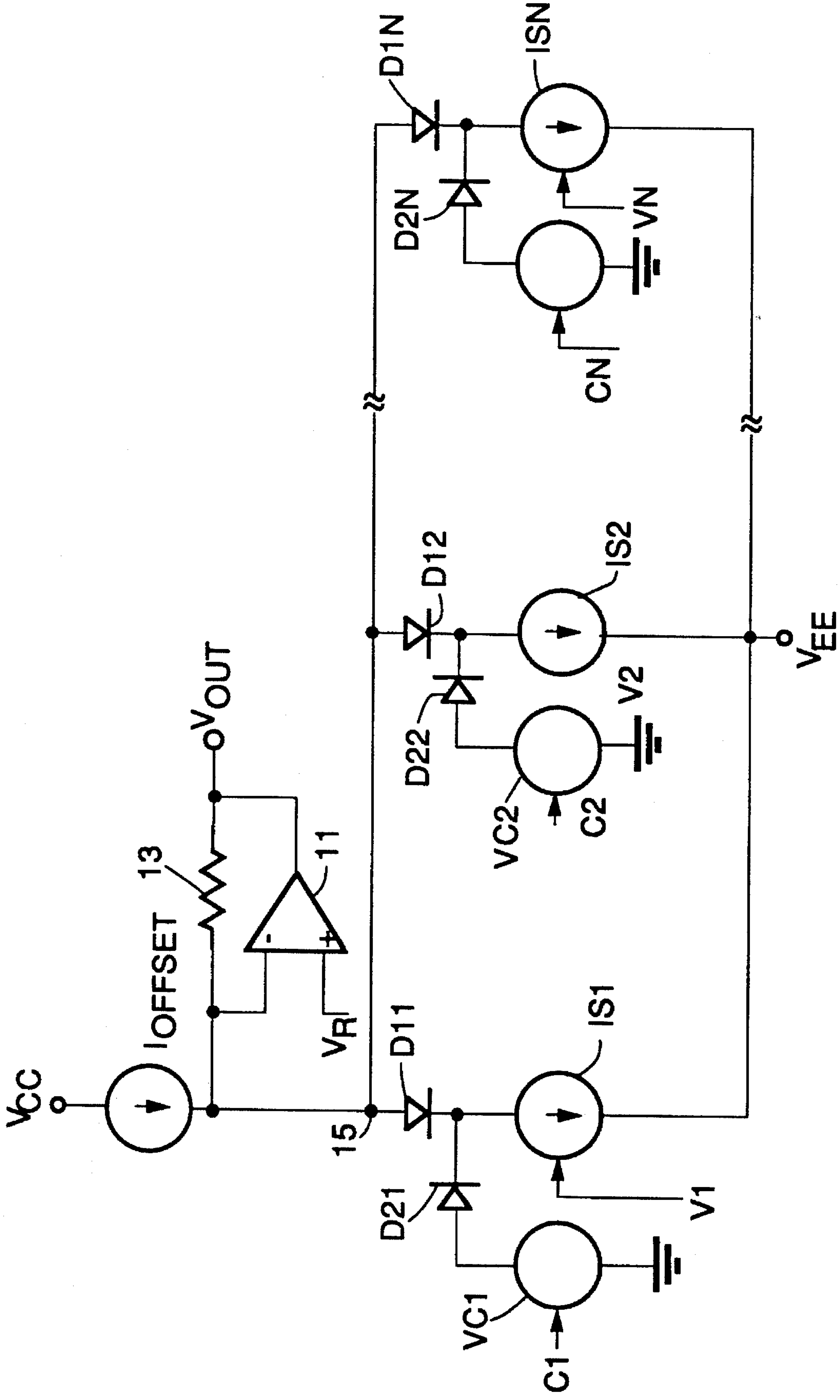
FIG. 1 is a generalized schematic diagram of an analog signal selection and summing circuit in accordance with the invention.

In the following detailed description and in the several figures of the drawing, like elements are identified with like reference numerals.

Referring now to FIG. 1, set forth therein is a generalized schematic diagram of an analog signal selection and summing circuit in accordance with the invention that multiplexes or selects input voltages V1 through VN. The selection and summing circuit includes an operational amplifier 11 having a feedback resistor 13 connected between its output and its inverting input, and the output of the operational amplifier $V_{out}$ comprises the output of the selection and summing circuit. The non-inverting input of the operational amplifier is connected to a reference voltage $V_R$.

The inverting input of the operational amplifier 11 is further connected to a virtual ground bus 15, and an offset current source $I_{offset}$ is connected between a bias voltage $V_{CC}$ and the virtual ground bus 15. Pursuant to known techniques, the offset current source $I_{offset}$ is utilized to selectively locate the range of operation of the output of the operational amplifier 11. The anodes of a plurality of diodes D11 through D1N are commonly connected to the virtual ground bus 15, and respective voltage controlled current sources IS1 through ISN are respectively connected between respective cathodes of the diodes through D1N and a bias voltage $V_{EE}$. The voltage controlled current sources are controlled by the input voltages V1 through VN. The cathodes of a plurality of diodes D21 through D2N are respectively connected to the cathodes of the diodes D11 through D1N and therefore also to the voltage controlled current sources IS1 through ISN. The anodes of the diodes D21 through D2N are respectively connected to diode controlling voltage sources VC1 through VCN which by way of illustrative example are controlled by control signals C1 through CN provided by digital control circuitry (not shown) that is responsive to digital control inputs.

The outputs of the input voltage controlled current sources IS1 through ISN are selectively steered to the operational amplifier virtual ground bus 15 (which is at the reference potential $V_R$) by controlling the diode control voltage sources VC1 through VCN to control the conductive states of the diodes D11 through D1N and D21 through D2N. In particular, the output of a given voltage controlled current source is steered to the virtual ground bus 15 when the associated control voltage source provides a voltage of $(V_R-V_d)$, where $V_d$ is the forward conduction voltage of a diode. If the associated control voltage source provides a voltage of $(V_R+V_d)$, the output of the current source is steered to the voltage source. Simply stated, if a control voltage source provides a voltage of $(V_R-V_d)$, the associated input voltage contributes to the output voltage $V_{out}$; and if a control voltage source provides a voltage of $(V_R+V_d)$, the associated input voltage does not contribute to the output voltage $V_{out}$. In terms of digital control, the former can be selected by a 1 and the latter can be selected by a 0, for example.

Taking the particular example of steering the output of the controlled current source IS1, if the voltage source VC1 provides a voltage of $(V_R-V_d)$, the diode D21 will be non-conductive while the diode D11 will be conductive, thereby steering the current IS1 to the virtual ground bus 15. If the voltage source V1 provides a voltage of $(V_R+V_d)$, the diode D11 will be non-conductive while the diode D21 will be conductive, thereby steering signal current IS1 to the diode control voltage source VC1.

Thus, by digitally controlling the diode control voltage sources VC1 through VCN, the signal currents IS1 through ISN, which represent and are indicative of the input voltages V1 through VN, can be respectively steered to the virtual ground input of the operational amplifier 11. If more than one signal current is steered to the virtual ground bus, the currents add.

The output of the operational amplifier can be expressed as follows:

$$V_{out}=R_F*a_aIS1+a_2IS2+\ldots+a_NISN]$$

wherein $R_F$ is the resistance of the feedback resistor 13, and wherein each of the coefficients $a_1$, $a_2$, . . . $a_N$ is a 0 or 1 depending whether the corresponding current source ISI is selected.

Thus, for the case where the controlled signal currents are linearly proportional to the input voltages V1 through VN, the selection and summing circuit output voltage $V_{out}$ is proportional to the sum of the input voltages, with the scaling determined by the resistance $R_F$ of the feedback resistor 13. If only one controlled current source is summed at the virtual ground bus 15, the output voltage $V_{out}$ is proportional to the input voltage controlling such current source.

Although the foregoing has been a description and illustration of specific embodiments of the invention, various modifications and changes thereto can be made by persons skilled in the art without departing from the scope and spirit of the invention as defined by the following claims.

What is claimed is:

1. An analog signal selection and summing circuit comprising:

a summing amplifier having a current summing input;

a plurality of voltage controlled current sources responsive to a plurality of input voltages;

a plurality of controlled voltage sources respectively associated with said current sources;

a plurality of switching means respectively associated with said current sources for switching outputs of said current sources to said summing input pursuant to control by the associated controlled voltage source, each of said switching means comprises first and second current steering diodes which are controlled such that current of the associated voltage controlled current source is steered to summing node when the associated controlled voltage source provides a first predetermined voltage, and the current of the associated voltage controlled current source is steered to the controlled voltage source when the associated voltage source provides a second predetermined voltage.

2. The analog signal selection and summing circuit of claim 1 wherein said first steering diode is connected between the summing node and the output of the associated voltage controlled current source and said second steering diode is connected between the associated voltage controlled current source and said controlled voltage source, whereby said first predetermined voltage provided by said controlled voltage source renders said first diode conductive and said second diode non-conductive, and said second voltage provided by said controlled voltage source renders said first diode non-conductive and said second diode conductive.

3. An analog signal selection and summing circuit comprising:

a summing operational amplifier having its non-inverting input connected to a reference voltage $V_R$ and having its inverting input as a current summing input;

a plurality of voltage controlled current sources responsive to a plurality of input voltages;

a plurality of controlled voltage sources respectively associated with said current sources; and a plurality of switching diode pairs respectively associated with said current sources and respectively responsive to said plurality of controlled voltage sources for controllably switching outputs of said current sources to said summing input, each summing diode pair including (a) a first diode having its anode connected to said current summing input and its cathode connected to the associated current source, and (b) a second diode having its anode connected to the associated controlled voltage source and its cathode connected to the associated current source;

whereby said first diode is rendered non-conductive and said second diode is rendered conductive by a control voltage $V_R+V_D$ provided by the associated controlled voltage source, and whereby said first diode is rendered conductive and said second diode is rendered non-conductive by a control voltage $(V_R-V_d)$ provided by the associated controlled voltage source, where $V_d$ is the forward conduction diode voltage.

* * * * *